United States Patent
Sharma et al.

(10) Patent No.: US 7,617,390 B2
(45) Date of Patent: Nov. 10, 2009

(54) SERVER AUTHENTICATION IN NON-SECURE CHANNEL CARD PIN RESET METHODS AND COMPUTER IMPLEMENTED PROCESSES

(75) Inventors: Aseem Sharma, Fremont, CA (US);
Ellen H. Siegel, San Carlos, CA (US);
Tanjore S. Ravishankar, San Jose, CA (US); Joe Wei, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 957 days.

(21) Appl. No.: 10/877,842

(22) Filed: Jun. 25, 2004

(65) Prior Publication Data

US 2005/0289652 A1   Dec. 29, 2005

(51) Int. Cl.
*G06F 15/177*   (2006.01)
*G06F 12/14*   (2006.01)
(52) U.S. Cl. .......................... 713/1; 713/184; 380/278; 380/279
(58) Field of Classification Search .................. None
See application file for complete search history.

(56) References Cited

U.S. PATENT DOCUMENTS 6,141,752 A   10/2000   Danes et al. ................ 713/172
7,472,276 B2 *   12/2008   Vanstone .................... 713/175
2002/0184485 A1 *   12/2002   Dray et al. .................. 713/150
2003/0018893 A1   1/2003   Hess et al. .................. 713/169
2004/0103325 A1 *   5/2004   Priebatsch .................. 713/202

FOREIGN PATENT DOCUMENTS

| AU | 2004100268 A4 | 6/2004 |
| EP | 1 168 259 A2 | 1/2002 |
| EP | 1 365 307 A2 | 11/2003 |
| WO | WO 01/38950 A2 | 5/2001 |

* cited by examiner

*Primary Examiner*—Jung Kim
(74) *Attorney, Agent, or Firm*—Martine Penilla & Gencarella, LLP

(57) ABSTRACT

A method for resetting a pin on an access card is disclosed. The method includes generating a server authentication (SA) public key and an SA private key and attempting a write of the SA public key to the access card over a non-secure channel. The method further includes determining if the access card currently contains an existing SA public key. The attempted write of the SA public key is handled by one of: (i) completing the attempted write of the SA public key to the access card over the non-secure channel if it is determined that the access card did not contain an existing public key; (ii) denying the attempted write of the SA public key to the access card over the non-secure channel if it is determined that the existing SA public key matches the SA public key that is attempted by the write; and (iii) denying the attempted write of the SA public key to the access card over the non-secure channel if it is determined that the existing SA public key does not match the SA public key that is attempted by the write.

15 Claims, 3 Drawing Sheets

216a

| Command | CLS | INS | P1 | P2 | Lc | Data Field/Description |
|---|---|---|---|---|---|---|
| SET SA KEY | 0x80/84 | 0xB4 | 0x00 | P2 | Lc | P2=0x01, set RSA modulus ← 216a-1<br><br>P2=0x02, set RSA private exponent (not used)<br><br>P2=0x03, set RSA public exponent ⎫ 216a-2<br><br>P2=0x04, initialize RSA key ← 216a-3 |

| | Load SA public Key with | SA public key Instance in the card | Check | Enrollment (card) | Enrollment (browser) |
|---|---|---|---|---|---|
| 402 | Secure Channel | null | -- | 90 00 | success |
| 404 | Non-secure channel | null | -- | 90 00 | success |
| 406 | Secure channel | non-null | | | success |
| 408 | Non-secure channel | non-null | matched<br>un-matched | 69 91<br>69 92 | exception (success)<br>exception (fail) |

SERVER AUTHENTICATION IN NON-SECURE CHANNEL CARD PIN RESET METHODS AND COMPUTER IMPLEMENTED PROCESSES

CROSS REFERENCE TO RELATED APPLICATIONS

This application is related to U.S. patent application Ser. No. 10/877,350, entitled "Method for Using Java Servlets as a Stack Based State Machine," and U.S. patent application Ser. No. 10/877,743, entitled "Authentication System and Method for Operating the Same," both filed on an even date with the present application. The disclosure of each related application identified above is incorporated herein by reference.

BACKGROUND

Controlling access to computing resources and data is of major importance in today's digital security environment. Without sufficient security measures to restrict access to authorized entities, sensitive data and resources can be compromised beyond recovery. Thus, a recognized need exists for strong authentication mechanisms to control access to vulnerable computing domains. However, implementation of many currently available strong authentication mechanisms requires expensive and complex security system deployments, thus deterring implementation by many entities that could benefit from stronger authentication.

For example, Public Key Infrastructure (PKI) represents a set of standards for creating, storing, and managing a symmetric keys that can be used for authentication. Though PKI provides strong authentication, security consumer adoption of PKI has been limited due to the significant expense and complexity of PKI deployment. Therefore, security consumers have been traditionally required to choose between weak single factor authentication, e.g., username/password only, or stronger authentication, e.g., PKI, involving complex and expensive deployments. Consequently, a need exists for an authentication mechanism that is stronger than single factor and does not require the complex and expensive deployment of PKI.

Cards that communicate under a system defined protocol (e.g., the Java™ Card Enterprise Software (JCES)), are commonly designed as secure repositories of applications and data. Privileged operations such as loading new applications, updating secured data and changing a user's pin requires the establishment of a mutually authenticated secure connection with an agent in possession of the card's master key. This is referred to as a secure channel, as defined in the Global Platform specification. For more information, reference may be made to GlobalPlatform.org, and articles published by the Global Platform organization.

Managing master keys is a very sensitive proposition, and in most deployments requires a Hardware Security Module (HSM) and Public Key Infrastructure (PKI), involving a great deal of complexity and expense. As such, support for non-privileged operations requiring the master key are denied. Consequently, entry level systems that only have non-secured channels cannot take advantage of the added security provided by 2-Factor authentication (i.e., Factor 1: something you have; Factor 2: something you know). One minimum functionality needed for an entry level card is to allow users to reset their pin, in case they forget the pin. Unfortunately, resetting the pin is a privileged operation that requires a master key, so as to avoid non-trusted servers from resetting the pin, and thus sacrificing the security provided by the 2-Factor authentication.

In view of the foregoing, there is a need for methods that will enable resetting of a pin for a card in a secure way that enables authentication of the server that is asked to reset the pin. The methods should allow for this security over a non-secured channel, so as to make entry level cards more practical for base level operation.

SUMMARY

It should be appreciated that the present invention can be implemented in numerous ways, such as a process, an apparatus, a system, a device or a method on a computer readable medium. Several inventive embodiments of the present invention are described below.

A method for resetting a pin on an access card is disclosed. The method includes generating a server authentication (SA) public key and an SA private key and attempting a write of the SA public key to the access card over a non-secure channel. The method further includes determining if the access card currently contains an existing SA public key. The attempted write of the SA public key is handled by one of: (i) completing the attempted write of the SA public key to the access card over the non-secure channel if it is determined that the access card did not contain an existing public key; (ii) denying the attempted write of the SA public key to the access card over the non-secure channel if it is determined that the existing SA public key matches the SA public key that is attempted by the write; and (iii) denying the attempted write of the SA public key to the access card over the non-secure channel if it is determined that the existing SA public key does not match the SA public key that is attempted by the write.

A method for authenticating a server for resetting a pin of an access card is disclosed. The method includes negotiating an out-of-band reset request to enable initiation of a pin reset process. Once the out-of-band request is approved, receiving login data of a user to identify the user as having preliminary access to reset the pin. The method includes obtaining a card unique ID (CUID) from the access card and enabling verification of the CUID against data present in a user/card identification database, and the access card has a previously stored sever authentication (SA) public key and the server maintains an SA private key. The method further includes sending a challenge to the server, receiving the challenge in an encrypted state, and decrypting the received challenge using the SA public key. Resetting of the pin of the access card is enabled if a decrypted challenge is the same as the challenge sent to the server.

Although specific examples were provided to illustrate examples of resetting a pin when a master key is not used, this secure protocol can be extended to other communication processes that need security, while still only communicating through a non-secure channel. Thus, it will be understood by those skilled in the art that the examples provided herein are equally applicable to other operations, which should be transacted under a given level of managed security, but only a non-secure channel is provided.

Other aspects of the invention will become apparent from the following detailed description, taken in conjunction with the accompanying drawings, illustrating by way of example the principles of the invention.

BRIEF DESCRIPTION OF THE DRAWINGS

FIGS. 3 and 4 illustrate tables for a Set SA Key command and enrollment states when attempts are made to install a new SA Public key on to a card, in accordance with one embodiment of the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Figure 1:
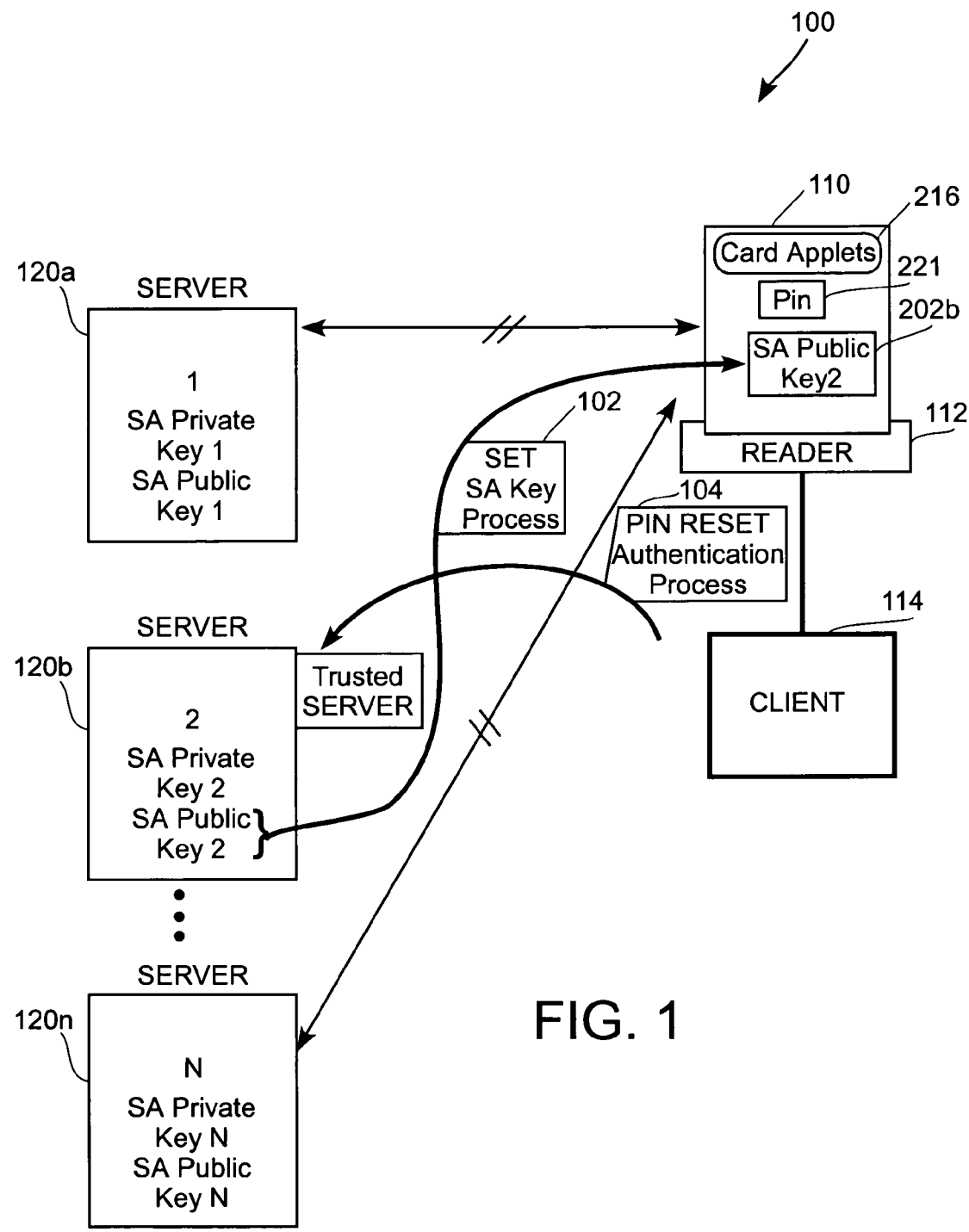
FIG. 1 shows a high level diagram of an environment where a client accessing a card is in communication with one or more servers, and server authentication is needed to ensure proper pin reset operations in unsecured communications lacking a master key, in accordance with one embodiment of the present invention.

FIG. 1 illustrates a client-server environment 100 where a plurality of servers 120a, 120b, 120n may be capable of communicating with the client 114. The client 114 is shown connected to a reader 112 which in turn, is connected to a card 110. The card 110 will contain card applets 216, a pin 221, and a place for storing a server authentication (SA) public key. In an environment where privileged operations that require a master key are not enabled, it is customary to restrict certain access procedures to the card 110. Managing using a master key is a very sensitive proposition, and most deployments require a hardware security module (HSM), and a public key infrastructure (PKI), which involve a great deal of complexity and expense.

Thus, in the client-server environment 100, the environment does not enable use of a master key and thus privileges for performing certain operations are blocked or not enabled. However, in accordance with one embodiment of the present invention, procedures are provided to enable a secure reset of a pin 221 of the card 110 without using a master key. As mentioned earlier, it is important to accommodate users of the card 110 who may forget their pin 221 or are blocked from using their pin 221 (e.g., by attempting too many incorrect pin inputs), and request access to unblock or reset the pin so that they can get access to the card 110 and be authenticated as an allowed user to operate procedures of the card 110, or access services or content locked by the card 110.

As an example only, the card 110 may be a card that functions in accordance with exemplary Java Card™ operations. Java Card™ technology enables smart cards and other devices with very limited memory to run small applications, called applets, that employ Java technology. It provides smart card manufacturers with a secure and interoperable execution platform that can store and update multiple applications on a single device. Broadly speaking, the technology enables developers to build, test, and deploy applications and services rapidly and securely. This accelerated process reduces development costs, increases product differentiation, and enhances value to customers. In a manner complementary to the Standard, Enterprise, and Mobile editions of the Java 2 Platform, Java Card technology makes it easy to integrate security tokens into a complete Java software solution. It should be kept in mind, however, that the methods defined herein, which enable resetting of a pin through a non-secure channel, in a secure way that authenticates the server, can be used in any system that needs this functionality. Thus, the methods of the present invention are by no means limited to the interaction with a set Java Card standard or standards. For reference purposes, the Java Card™ technology is also commercially referred to, in some implementations, as the Java™ Card Enterprise Software (JCES).

To provide a secure mechanism for unblocking the pin without requiring a master key, client software provided by the card applets 216, will use an asymmetric pair of PKI server keys, called the server authentication (SA) key pair. The private key will be kept secured at a trusted server, and the public key will be stored by the card applet 216. As shown, there may be any number of servers 120, however, server 120b is the trusted server that can communicate with card 110. Server 120b became the trusted server because server 120b installed its SA public key 2 onto the card 110. Card 110 shows the SA public key 2 at location 202b. A SET SA key process 102 will be charged with installing the SA public key 2 onto the card 110, and the SET SA key process 102 will be part of the card applets 216. The SET SA key process 102 will be described in greater detail below.

However, once the SET SA key process 102 has been established between server 120b and the card 110, other servers such as server 120a through 120n will be regarded as non-trusted servers, since their private keys will not match the public key stored on the card 110. When a pin reset authentication process 104 is requested by the client of the card 110, the pin reset authentication process 104 is charged with ensuring and authenticating that the server 102b is a trusted server. Server 120b will be a trusted server if server 120b has an SA private key 2, which matches the SA public key 2 installed on the card 110. Once verification is completed to ensure that server 120b is a trusted server, the pin reset authentication process will allow the user accessing the card 110 through the client 114, to reset the pin. More details regarding the pin reset authentication process 104 will be described below with reference to FIG. 2.

From the point of view of the card, it is necessary to trust that the agent approving the pin reset is, in fact, a trusted server, such as server 120b. The pin reset authentication process 104 will include a challenge-response authentication where the card applet 216 generates a challenge that is sent to the server 120b to be encrypted and returned. To support server authentication, the card applet 216 must go through each of the processes of setting the SA key 102 as well as the pin reset authentication 104.

Broadly speaking, the server authentication protocol requires that the card applet 216 have access to the SA public key 202b with which to decrypt the server's response, and this key may either be loaded during card issuance via a secure channel, or it may be done by the card enrollment browser applet during card enrollment. By ensuring that each of the SET SA key process 102 and the pin reset authentication process 104, be completed to reset a pin 221, a rogue agent will be prevented from modifying the key, and the card will be prevented from being coerced into trusting a malicious server.

To provide further security, the card 110 will accept at most, one update outside of a secure channel to the SA public key 102b. However, if a secure channel is provided, any number of updates of the SA public key 102b will be allowed since in that case, both parties are authenticated using the card's master key. However, the following discussion will focus on setting the SA key process 102 and the pin reset authentication process 104 in the case where the master key is not available, and a secure reset of the pin is requested. The non-secure channel route will commonly be the route taken by an entry level deployment, which does not require the expensive aspects setting up and managing secure connections.

Thus, if a rogue agent sets the SA public key 202b on the card prior to enrollment, the enrollment applet will detect that a non-secure key update has already occurred, and unless the existing SA public key 202b is the same as the one it is trying to store, it will refuse to activate the card. If the enrollment applet is able to set the SA public key 202b on the card, then no feature that attempts to modify the public key 202b over a non-secure channel would be allowed by the card applet 216. Consequently, this process ensures that a valid SA public key 202b, corresponding to a secured SA private key 2 of the server 120b is provided.

As mentioned above, the SA private key 2 of server 120b can be stored on the card 110 at either manufacturing time, or during an enrollment process controlled by an enrollment applet. The process will therefore ensure that when a pin reset operation is requested using the pin reset authentication process 104, the card 110 is able to verify that the authorization originates from a trusted server (one with possession of the designated SA private key).

Figure 2:
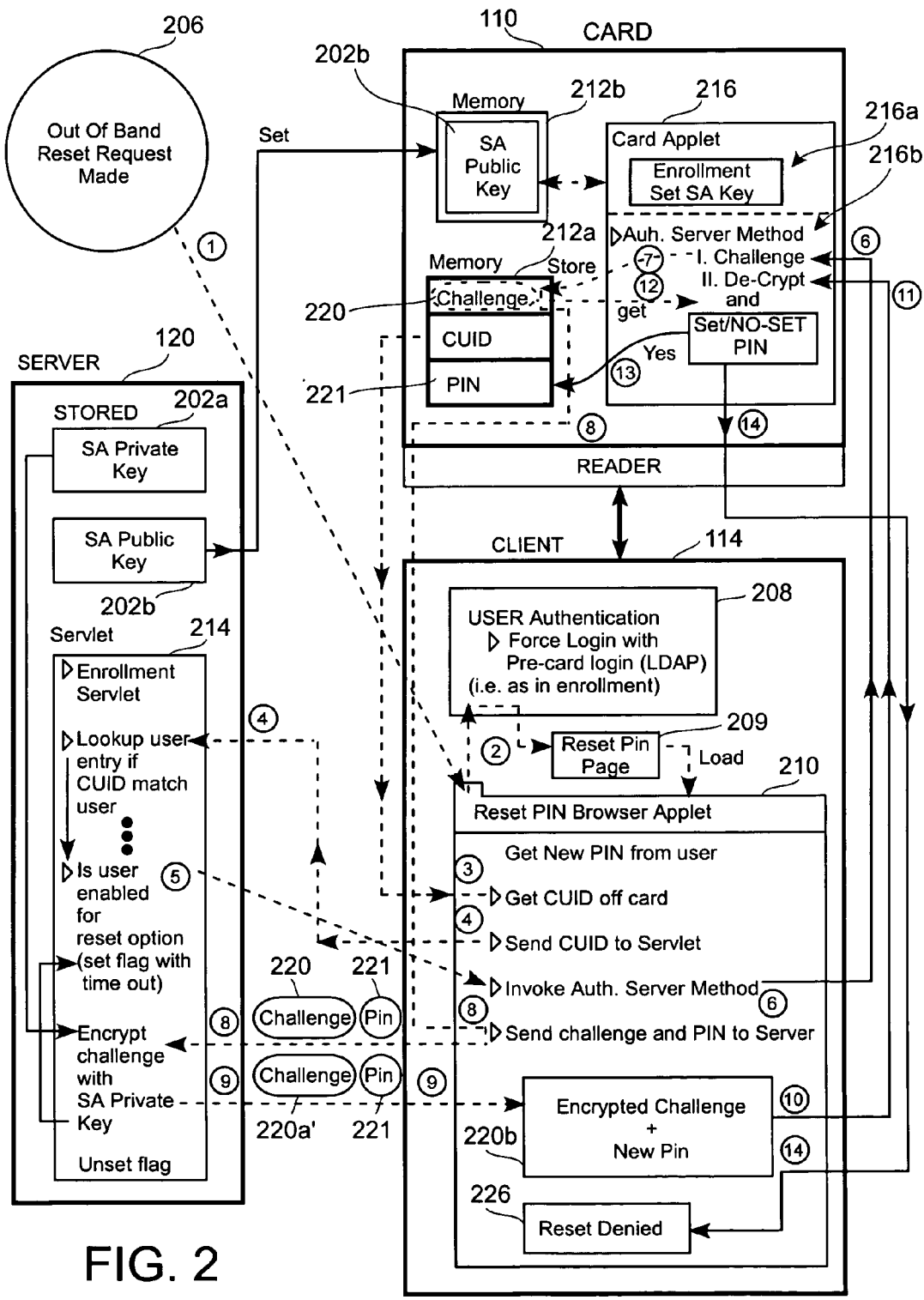
FIG. 2 illustrates a flow diagram of the method operations that can take place in setting a Server Authentication (SA) Public Key and authenticating the server during a pin reset operation, in accordance with one embodiment of the present invention.

FIG. 2 illustrates a detailed diagram of a server 120 interfacing with a client 114 and a card 110, in accordance with one embodiment of the present invention. It should be understood that the process operations described in FIG. 2 are exemplary, and some process operations can be performed in orders other than the order illustrated in FIG. 2.

As described above, it is first required to set the SA public key 202b to the card 110 in memory 212b of the card 110. The setting of the SA public key 202b to the card 110 will be controlled by the card applet 216, and specifically, the SET SA key process 216b. The process of setting the SA public key 202b on the card 110 will be described in greater detail with reference to FIGS. 3 and 4.

Still referring to FIG. 2, the process for pin reset authentication will be described in detail with the flow diagram and the authorize server method 216b of the card applet 216. The process begins when a user desiring to reset the pin on his or her card 110 will make an out-of-band reset request to an agent that is responsible for managing user access parameters for card 110 that may have been issued to one or more users. In one example, the out-of-band reset request may be made by having the user make a telephone call to an authorized agent that has access to the user records. The user records may include a database that includes a number of users, card unique identifiers (CUID) for the users, certificates, and other identifier information that links the user to the specific card 110.

Once the user is able to prove to the authorized agent that the user should have access to the card, the authorized agent will set a flag in the user's record. The flag will be set in the user's record to allow the system to proceed with the pin reset operation. In the client 114, an attempt to access the reset PIN page 209 requires that the user authenticate using a pre-card deployment authentication procedure of 208. Thus, the user is redirected first to user authentication 208. In one example, this procedure is a lightweight directory access protocol (LDAP) username and password.

After the information has been provided in user authentication 208, and the information passes and is accepted by the LDAP procedure (a single sign-on (SSO) token is generated during the LDAP process), the user is now redirected back to the reset pin page 209 (which is the page the user initially wanted to access), and which contains the reset pin browser applet that is loaded at the client 114 browser. This process is illustrated by process #2 arrow. The reset pin browser applet 210 is loaded to enable actual processing of the pin reset operations. The reset pin browser applet will ask the user for a new pin, and in one embodiment, the user must enter it twice and presses submit. At this point, this is the only actions needed from the user. Now, a sanity check is performed on the new pin, and in process #3, the CUID is retrieved from the card from the memory 112a. As mentioned earlier, each card will have a card unique identifier (CUID), which defines the card and enables mapping of specific cards to specific users. The pin reset browser applet 210 will send the obtained CUID to a servlet 214 of the server 120 in process #4. In addition, the single sign-on (SSO) token will be sent to the servlet 214. The SSO token identifies the user that completed the LDAP process.

Servlet 214 verifies that the user identified by the SSO token has the card With the provided CUID assigned, i.e., that the user entry for that user contains the CUID being presented with the SSO token. The servlet 214 will also determine if the user is enabled for the reset operation. As mentioned earlier, the flag was set by the administrator that received the out-of-band request to reset the pin. The flag is set in the user record and is set with a timeout, so as to enable the pin reset operation to proceed for a period of time. The period of time may vary, however, it should be set so that sufficient amount of time is allowed to proceed with the process. but not too long, to reduce the likelihood that unauthorized users/servers might attempt pin resets. As will be noted below, when the encryption happens at the servlet 214, the flag is unset.

Thus, if in process #5, it is determined that the user is enabled for the reset operation, the servlet returns control to the reset pin browser applet 210, which is brokering communication, and the reset pin browser applet 210 invokes the authorization server method in process #6. As shown, the authorization server method 216b of the card applet 216, will include two parts. The first part will include challenge generation in process #7. Thus, the authorization server method 216b will be charged with generating the challenge. In one embodiment, the challenge is a 128-byte challenge, which includes 10 bytes of PKCS #1, mode 1 padding, plus a real random number of 117 bytes. Of course, the challenge can take on any number of forms so long as it's generated in the first process #7 by the card applet 216. The generated challenge is temporarily stored in the memory 212a as a challenge 220. In process #8, the generated challenge is retrieved by the reset pin browser applet 210 from the card 110, and sent to the server 120.

In one embodiment, the challenge 220 and new pin 221 are sent together to be encrypted by the SA private key 202a of the server 120. The challenge is padded with the new pin and 01FFFF (standard padding), and sent as 220a/221. The SA private key 202a is preferably stored in a secure location on the server and accessed when an encryption operation is required so that a challenge and pin 220a can be encrypted. In process #9, the encrypted challenge 220a' and pin 221 is sent to the reset pin browser applet 210 and forwarded in process #10. Thus, the encrypted challenge & new pin 220b together will be sent in process #11 to the second part of the authorization server method 216b. In the second part of the authorization server method 216b, a decryption operation will have to be performed.

In another embodiment, only the challenge 220 is sent from the reset pin browser applet 210 to the servlet 214 for encryption. When the challenge is received in the encrypted condition as 220*a*', the new pin and the encrypted challenge 220*b* are sent to the card applet in process #10. Thus, in this example, the pin 221 is not sent in a round trip to the servlet 214 before being sent to the card applet.

The decryption of the encrypted challenge will be performed using the SA public key 202*b*. If the server being authenticated is not in possession of the corresponding private key (the other half of the keypair), then the decryption challenge will not match the original challenge 220 generated by the card. Thus, it is not known until after the decryption is performed whether the SA private key 202*a* was the correct key. Thus, it is the decrypted challenge which is compared to the original challenge 220 stored in the card (which is obtained in process #12 from memory 212*a*), and thus the server had the correct SA private key 202*a*. This will confirm that the have identified the trusted server, which is being authenticated by the card.

If a match is successful in process #13, the pin 221 will be reset using the new pin that was obtained from the user. As noted earlier, the new pin and the encrypted challenge are provided together in process #11 to ensure that the challenge and the new pin are being generated from the same source to further ensure security. If it is determined that the challenge that was decrypted was not the same, or the SA public key 202*b* could not decrypt the challenge, the authorization server method will proceed to process #14 where resetting of the pin is denied 226. Alternatively, if the match occurred and decryption was successful, the pin 221 will be reset in process #13. Should the card be removed from the reader during an authentication server operation (e.g. between sending the challenge and receiving the response), all state will be cleared on the card reset to ensure that no replay attacks can succeed.

FIGS. 3 and 4 will now be described with reference to the procedures for setting the SA public key on the card 110. As shown in FIG. 3, set SA key command is defined by an RSA key of 1024-bit length. There are three steps to set the key in accordance with the set SA key command. The operations of set modulus (P2=0x01), and set public exponent (P2=0x03), and initialize public key (P2=0x04), are performed. Item 216*a*-1 illustrates the data field description for setting the RSA modulus. Item 216*a*-2 defines the setting of the RSA private exponent (not used), and the setting of the RSA public exponent which is used when setting the SA public key. Initialized RSA key is shown by item 216*a*-3.

The table in FIG. 3 illustrates data fields of the commands used to set the key on the card 114. The card applets communicate via small messages called Application Protocol Data units (APDUs), and because the key is large, the command in one embodiment, is broken into 4 parts. The browser applet 210 will invoke the command segments in sequence, where the command is represented by the hex data in the table of FIG. 3. The 4 cases in the Data Field/Description part of the table show the 4 possible values for the P2 field of the Set SA Key command; for each of the 4 cases, the data portion of the message would contain the data specified in the comment. So when P2=0x10, the data would be the RSA modulus for the SA public key, when P2=0x03, the data would be the RSA public exponent for the SA public key, etc.

The return codes for the set SA key process are defined in FIG. 4. The table of FIG. 4 has four rows enumerated by row 402, row 404, row 406, and row 408. Row 402 illustrates a process by which the SA public key is loaded through a secure channel (which uses a master key). During the secure channel operation, it is determined that the SA public key instance in the card is null, and therefore, the public key has not previously been stored to the card. In this situation, an enrollment code 90 00 410 is shown indicating that the enrollment browser has succeeded in setting the SA public key. In row 404, a non-secure channel is used, and there is currently a null in the SA public key instance in the card. Therefore, this is the first time the SA public key is being loaded onto a card over a non-secure channel.

Because this is the first time the SA public key is being loaded onto the card over a non-secure channel, the enrollment card will illustrate a success by the codes 90 00 410. The enrollment process will therefore continue to allow the user to register the card. In row 406, a secure channel is used to provide and load a new SA public key. In this situation, an SA public key is currently stored on the card, and therefore, the result is non-null. However, because a secure channel is used to store the SA public key onto the card, the process will continue and illustrate a success in the enrollment process. As mentioned earlier, secure channel settings of the SA public key will be allowed any number of times and whether or not the card previously has had an SA public key stored thereon.

In row 408, a non-secure channel is used when the value of the SA public key instance in the card was non-null. In this situation, if the SA public key that is being stored onto the card that has a non-null value matches the same SA public key that is stored in the card already, a code 69 91 412 will be triggered. This code will indicate that an exception occurred. However, the enrollment and reset browser applets will be able to determine that code 69 91 is a case where the user is trying to re-write the SA public key with the same existing public key currently on the card, and the exception will be treated as a success to allow the user to complete the enrollment process. A re-write of the SA public key will be denied, as code 69 91 indicates an exception to the card. In another embodiment, the browser reset applet will notice that an SA Public key was already stored on the card, when if fact, no SA Public Key should have been on the card. Thus, in this case, it may be desired to maintain the exception, and prevent the enrollment process from proceeding.

Continuing with row 408, if using the non-secure channel, it is determined that the new SA public key does not match the currently stored SA public key on the card, a code 69 92 414 indicative of an exception will be generated. However, the enrollment process will also notice that the exception occurred and identify code 69 92 as a non-matching SA public key, and therefore fail the process. In such case, the enrollment process will not continue because the user is attempting to load an SA public key onto the card with a non-matching SA public key through a non-secure channel.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for resetting a pin on an access card, comprising:
   (a) generating a server authentication (SA) public key and an SA private key;
   (b) attempting a write of the SA public key to the access card over a non-secure channel;
   (c) determining if the access card currently contains an existing SA public key; and
   selecting the attempted write of the SA public key from one of:
      (i) completing the attempted write of the SA public key to the access card over the non-secure channel if it is determined that the access card did not contain an existing public key;
      (ii) denying the attempted write of the SA public key to the access card over the non-secure channel if it is determined that the existing SA public key matches the SA public key that is attempted by the write; and
      (iii) denying the attempted write of the SA public key to the access card over the non-secure channel if it is determined that the existing SA public key was written over a non-secure channel and does not match the SA public key that is attempted by the write;
   (d) attempting a reset of the pin on the access card from a server.

2. A method for resetting a pin on an access card as recited in claim 1, wherein the denying of (ii) signals an exception to an applet of the access card, the exception defining a code that prevents the write of the SA public key and allows continuation with an enrollment process to setup the access card for an individual.

3. A method for resetting a pin on an access card as recited in claim 1, wherein when the non-secure channel is converted into a secure channel, the attempt to write the SA public key is allowed whether or not the existing SA public key is present on the access card.

4. A method for resetting a pin on an access card as recited in claim 1, wherein the attempting a reset further includes:
   initiating a challenge to the server, the challenge being encrypted at the server using the SA private key;
   decrypting the encrypted challenge using the SA public key of the access card; and
   allowing reset of the pin on the access card when the decrypted challenge matches the challenge initiated to the server.

5. A method for resetting a pin on an access card as recited in claim 4, further comprising,
   receiving an out-of-band reset request indicating an intent to attempt the reset of the pin in operation (d); and
   setting a temporary flag to indicate an approval of the out-of-band reset request; and
   unsetting the flag when the challenge is encrypted, the reset process attempt is aborted, or a timer associated with the temporary flag has run out.

6. A method for resetting a pin on an access card as recited in claim 4, wherein allowing the reset of the pin on the access card when the decrypted challenge matches the challenge initiated to the server authenticates the server.

7. A method for resetting a pin on an access card as recited in claim 6, wherein the server being authenticated ensures that the server is a trusted server containing the SA private key pair that matches the SA public key.

8. A method for resetting a pin on an access card as recited in claim 4, wherein an authenticate server method enables: (I) generation of the challenge and (II) decryption of the challenge, and setting/not-setting of the pin.

9. A computer readable media containing program instructions for resetting a pin on an access card, the program instructions for resetting a pin on an access card comprising:
   (a) program instructions for generating a server authentication (SA) public key and an SA private key;
   (b) program instructions for attempting a write of the SA public key to the access card over a non-secure channel;
   (c) program instructions for determining if the access card currently contains an existing SA public key; and
   selecting the attempted write of the SA public key from one of:
      (i) program instructions for completing the attempted write of the SA public key to the access card over the non-secure channel if it is determined that the access card did not contain an existing public key;
      (ii) program instructions for denying the attempted write of the SA public key to the access card over the non-secure channel if it is determined that the existing SA public key matches the SA public key that is attempted by the write; and
      (iii) program instructions for denying the attempted write of the SA public key to the access card over the non-secure channel if it is determined that the existing SA public key was written over a non-secure channel and does not match the SA public key that is attempted by the write;
   (d) program instructions for attempting a reset of the pin on the access card from a server.

10. A computer readable media containing program instructions for resetting a pin on an access card as recited in claim 9, wherein the program instruction for denying (ii) signals an exception, the exception defining a code that denies the write of the SA public key and continuation with an enrollment process to setup the access card for an individual.

11. A computer readable media containing program instructions for resetting a pin on an access card as recited in claim 9, wherein when the non-secure channel is converted into a secure channel, the attempt to write the SA public key is allowed whether or not the existing SA public key is present on the access card.

12. A computer readable media containing program instructions for resetting a pin on an access card as recited in claim 9, wherein the program instructions for attempting a reset of the pin on the access card from a server further include:
   program instructions for initiating a challenge to the server, the challenge being encrypted at the server using the SA private key;
   program instructions for decrypting the encrypted challenge using the SA public key of the access card; and
   program instructions for allowing reset of the pin on the access card when the decrypted challenge matches the challenge initiated to the server.

13. A computer readable media containing program instructions for resetting a pin on an access card as recited in claim 12, further comprising,
   program instructions for receiving an out-of-band reset request indicating an intent to attempt the reset of the pin in operation (d); and
   program instructions for setting a temporary flag to indicate an approval of the out-of-band reset request; and
   program instructions for unsetting the flag upon completing the encryption of the challenge, the reset process attempt is aborted, or a timer associated with the temporary flag has run out.

14. A computer readable media containing program instructions for resetting a pin on an access card as recited in claim 13, wherein allowing the reset of the pin on the access card when the decrypted challenge matches the challenge initiated to the server authenticates the server.

15. A computer readable media containing program instructions for resetting a pin on an access card as recited in claim 14, wherein the server being authenticated ensures that the server is a trusted server containing the SA private key that matches the SA public key, to define a matching asymmetric key pair.

* * * * *